US010717156B2

(12) United States Patent
Mezawa

(10) Patent No.: US 10,717,156 B2
(45) Date of Patent: Jul. 21, 2020

(54) ADDITIVE MANUFACTURING HEAD AND MANUFACTURING MACHINE

(71) Applicant: DMG MORI CO., LTD., Yamatokoriyama-shi (JP)

(72) Inventor: Yuhei Mezawa, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 312 days.

(21) Appl. No.: 15/561,088

(22) PCT Filed: Mar. 7, 2016

(86) PCT No.: PCT/JP2016/056952
§ 371 (c)(1),
(2) Date: Sep. 25, 2017

(87) PCT Pub. No.: WO2016/152479
PCT Pub. Date: Sep. 29, 2016

(65) Prior Publication Data
US 2018/0056446 A1 Mar. 1, 2018

(30) Foreign Application Priority Data
Mar. 26, 2015 (JP) .................. 2015-064632

(51) Int. Cl.
*B23B 5/00* (2006.01)
*B23P 23/04* (2006.01)
(Continued)

(52) U.S. Cl.
CPC .............. *B23K 26/342* (2015.10); *B23B 5/00* (2013.01); *B23K 26/0006* (2013.01);
(Continued)

(58) Field of Classification Search
CPC ................ B23K 26/342; B23K 26/144; B23K 26/1464; B23K 26/0006; B23K 37/04;
(Continued)

(56) References Cited

U.S. PATENT DOCUMENTS

| 4,323,756 | A | * | 4/1982 | Brown | .................... | B22F 3/006 |
| | | | | | | 219/121.66 |
| 5,556,560 | A | * | 9/1996 | Ahola | ...................... | B23K 9/18 |
| | | | | | | 219/121.45 |

(Continued)

FOREIGN PATENT DOCUMENTS

JP 2008-190038 A 8/2008

OTHER PUBLICATIONS

International Search Report dated May 24, 2016 in PCT/JP2016/056952 filed Mar. 7, 2016.

*Primary Examiner* — Michael G Hoang
*Assistant Examiner* — Bonita Khlok
(74) *Attorney, Agent, or Firm* — Oblon, McClelland, Maier & Neustadt, L.L.P.

(57) ABSTRACT

An additive manufacturing head includes: a nozzle configured to discharge material powder; a rotary member connected with the nozzle, including a first material powder passage formed in the rotary member to direct the material powder to the nozzle, and configured to rotate to cause the nozzle to move in the circumferential direction about a laser beam emitted toward the workpiece; and a stationary member including a second material powder passage which is formed in the stationary member and into which the material powder is introduced, the stationary member being disposed directly beside the rotary member in the direction of the rotational axis of the rotary member. A third material powder passage communicating with the first material powder passage and the second material powder passage and extending annularly about the rotational axis of the rotary member is formed between the stationary member and the rotary member.

9 Claims, 12 Drawing Sheets

(51) Int. Cl.
*B23K 26/00* (2014.01)
*B23K 26/14* (2014.01)
*B23K 26/144* (2014.01)
*B23K 37/04* (2006.01)
*B22F 3/105* (2006.01)
*B23K 26/342* (2014.01)
*B33Y 30/00* (2015.01)
*B29C 67/00* (2017.01)
*B23K 26/064* (2014.01)
*B28B 1/00* (2006.01)
*B22F 3/24* (2006.01)

(52) U.S. Cl.
CPC ........ *B23K 26/0093* (2013.01); *B23K 26/064* (2015.10); *B23K 26/144* (2015.10); *B23K 26/147* (2013.01); *B23K 26/1482* (2013.01); *B23K 37/04* (2013.01); *B23P 23/04* (2013.01); *B28B 1/001* (2013.01); *B29C 67/00* (2013.01); *B33Y 30/00* (2014.12); *B22F 2003/1056* (2013.01); *B22F 2003/247* (2013.01); *Y02P 10/295* (2015.11)

(58) Field of Classification Search
CPC .............. B23K 26/0093; B23K 26/147; B23K 26/1482; B23B 5/00; B33Y 30/00; B28B 1/001
USPC .............................................. 219/76.12, 76.1
See application file for complete search history.

(56) References Cited

U.S. PATENT DOCUMENTS

| | | | |
|---|---|---|---|
| 5,578,227 A * | 11/1996 | Rabinovich | B23K 26/34 219/121.63 |
| 6,144,008 A * | 11/2000 | Rabinovich | B22F 3/005 219/121.64 |
| 6,441,338 B1 * | 8/2002 | Rabinovich | B21D 37/205 219/121.64 |
| 2008/0178994 A1 | 7/2008 | Qi et al. | |
| 2017/0050198 A1 * | 2/2017 | Ohno | B23K 26/144 |
| 2017/0355141 A1 * | 12/2017 | Bettermann | B33Y 30/00 |

* cited by examiner

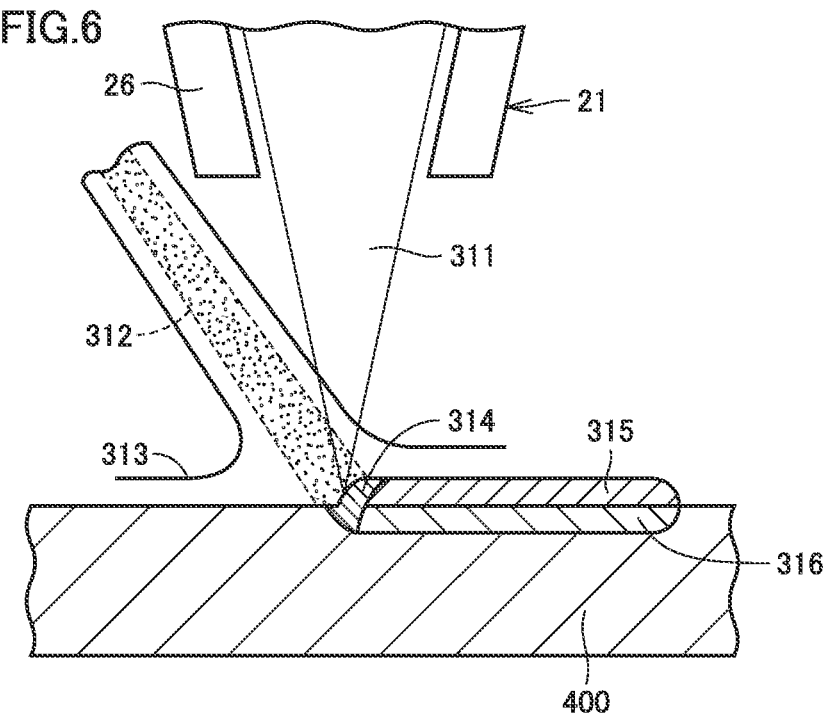
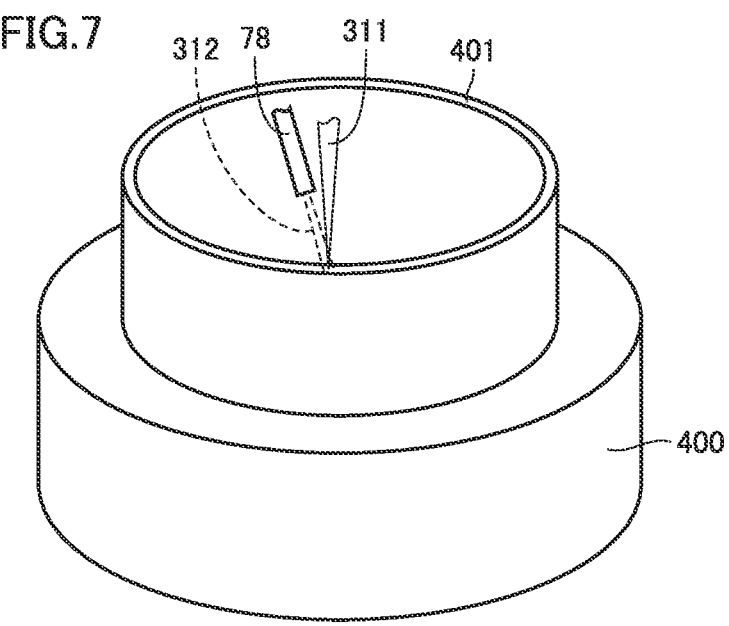

ADDITIVE MANUFACTURING HEAD AND MANUFACTURING MACHINE

TECHNICAL FIELD

The present invention relates to additive manufacturing heads and manufacturing machines.

BACKGROUND ART

A method for manufacturing an article by means of conventional additive manufacturing is disclosed for example in Japanese Patent Laying-Open No. 2008-190038 that discloses a laser net shape manufacturing (LNSM) method for producing and repairing an article such as BLISK, compressor blade, turbine blade, and compressor part (Patent Document 1). The LNSM method uses a laser and an adaptive toolpath deposition method to create a three-dimensional geometry by precisely cladding thin layers of metal powder on a base material.

CITATION LIST

Patent Document

PTD 1: Japanese Patent Laying-Open No. 2008-190038

SUMMARY OF INVENTION

Technical Problem

Additive manufacturing is a process of creating a three-dimensional shape by depositing materials onto a workpiece. The mass of the workpiece has been increased after additive manufacturing. In a process for a workpiece that uses such additive manufacturing, the workpiece and an additive manufacturing head are moved relative to each other and meanwhile, material powder is discharged and an energy beam such as laser beam or electron beam is emitted from the additive manufacturing head toward the workpiece. At this time, the direction in which the workpiece and the additive manufacturing head are moved relative to each other and the direction in which the material powder is discharged toward the workpiece have an optimum angular relation therebetween that provides a high deposition efficiency of material powder on the workpiece.

The direction in which the workpiece and the additive manufacturing head are moved relative to each other changes as the process proceeds. In order to keep the optimum angular relation between the direction in which the workpiece and the additive manufacturing head are moved relative to each other and the direction in which the material powder is discharged toward the workpiece, it is necessary to circumferentially move a nozzle discharging the material powder about the energy beam. For an additive manufacturing head whose nozzle infinitely revolves about an energy beam, however, it is difficult to simply configure a mechanism for feeding material powder to the nozzle.

An object of the present invention is therefore to solve the above problem and provide an additive manufacturing head that implements a mechanism configured simply to feed material powder to an infinitely revolving nozzle, as well as a manufacturing machine including such an additive manufacturing head.

Solution to Problem

An additive manufacturing head according to the present invention is configured to be movable relative to a workpiece while discharging material powder and emitting an energy beam toward the workpiece. The additive manufacturing head includes: a nozzle configured to discharge the material powder; a rotary member connected with the nozzle, including a first material powder passage formed in the rotary member to direct the material powder to the nozzle, and configured to rotate to cause the nozzle to move in a circumferential direction about the energy beam emitted toward the workpiece; and a stationary member including a second material powder passage which is formed in the stationary member and into which the material powder is introduced, the stationary member being disposed directly beside the rotary member in a direction of a rotational axis of the rotary member. A third material powder passage communicating with the first material powder passage and the second material powder passage and extending annularly about the rotational axis of the rotary member is formed between the stationary member and the rotary member.

A manufacturing machine according to the present invention is capable of subtractive manufacturing and additive manufacturing for a workpiece. The manufacturing machine includes: the above-described additive manufacturing head; a workpiece holder configured to hold a workpiece; and a tool holder configured to hold a tool to be used for subtracting manufacturing for the workpiece.

Advantageous Effects of Invention

According to the present invention, an additive manufacturing head having a mechanism configured simply to feed material powder to an infinitely revolving nozzle, as well as a manufacturing machine including such an additive manufacturing head can be provided.

BRIEF DESCRIPTION OF DRAWINGS

FIG. 6 is an enlarged cross-sectional view of a surface of a workpiece during additive manufacturing.

FIG. 7 is a perspective view showing an example of additive manufacturing performed on a workpiece.

DESCRIPTION OF EMBODIMENTS

Figure 1:
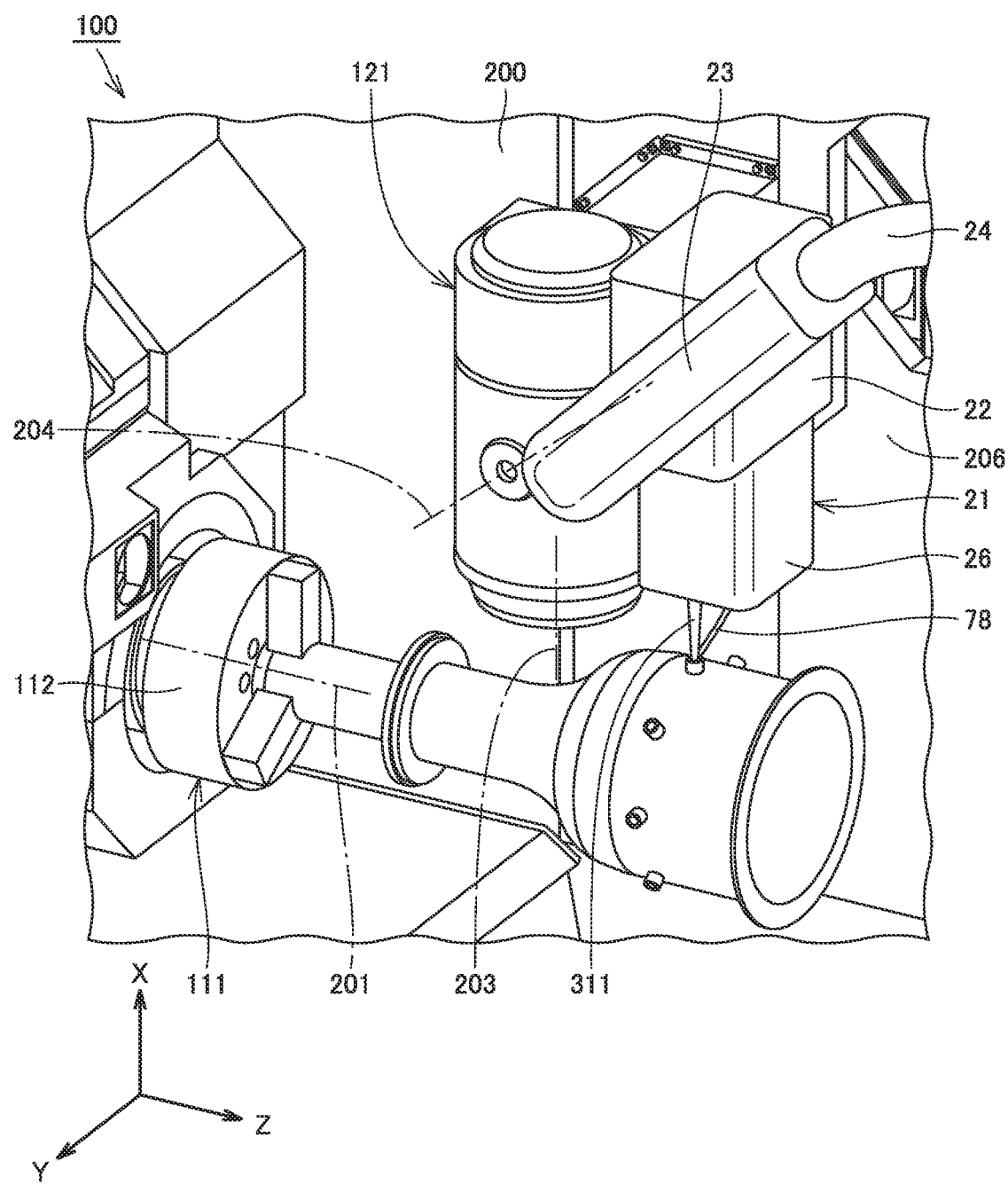
FIG. 1 is a perspective view showing a manufacturing machine including an additive manufacturing head in a first embodiment of the present invention.

Embodiments of the present invention will be described with reference to the drawings. In the drawings referenced below, the same or corresponding members are denoted by the same numerals.

First Embodiment

FIG. 1 is a perspective view showing a manufacturing machine including an additive manufacturing head in a first embodiment of the present invention. In FIG. 1, details in a machining area of the manufacturing machine are shown.

Referring to FIG. 1, manufacturing machine 100 is an AM/SM hybrid manufacturing machine capable of additive manufacturing (AM) for a workpiece and subtractive manufacturing (SM) for a workpiece. Manufacturing machine 100 has a turning function performed by means of a stationary tool and a milling function performed by means of a rotary tool, as functions of SM.

The overall structure of manufacturing machine 100 is described. Manufacturing machine 100 includes a first headstock 111, a second headstock (not shown), a tool spindle 121, and a lower tool rest (not shown). First headstock 111, the second headstock, tool spindle 121, and the lower tool rest are disposed in a machining area 200 enclosed by a splashguard 206.

First headstock 111 has a spindle 112 for rotating a workpiece in a turning process performed by means of a stationary tool. Spindle 112 is provided rotatably about a central axis 201 extending in parallel with a Z axis that extends horizontally. Spindle 112 is provided with a chuck mechanism for detachably holding a workpiece. The second headstock (not shown) is structured similarly to first headstock 111 and disposed to face first headstock 111 in the Z-axis direction.

Tool spindle (upper tool rest) 121 causes a rotary tool to rotate in a milling process performed by means of the rotary tool. Tool spindle 121 is provided rotatably about a central axis 203 extending in parallel with an X axis that extends vertically. Tool spindle 121 is provided with a clamp mechanism for detachably holding the rotary tool.

Tool spindle 121 is supported above a bed through a column or the like (not shown). Tool spindle 121 is provided to be movable, by any of various feed mechanisms, guide mechanisms, a servo motor, and the like provided on the column or the like, in the X-axis direction, a Y-axis direction extending horizontally and orthogonally to the Z-axis direction, and the Z-axis direction. The position of machining by the rotary tool attached to tool spindle 121 is displaced three-dimensionally as tool spindle 121 moves in the X-axis direction, the Y-axis direction, and the Z-axis direction. Further, tool spindle 121 is provided to be swivelable about a central axis 204 extending in parallel with the Y axis.

To the lower tool rest (not shown), a plurality of stationary tools for turning are attached. The lower tool rest has a so-called turret shape, and a plurality of stationary tools are attached radially to the lower tool rest for performing swivel indexing. The lower tool rest is supported above the bed through a saddle or the like (not shown). The lower tool rest is provided to be movable in the X-axis direction and the Z-axis direction by any of various feed mechanisms, guide mechanisms, a servo motor, and the like provided on the saddle or the like.

Manufacturing machine 100 includes an additive manufacturing head 21. Additive manufacturing head 21 performs additive manufacturing by discharging material powder toward a workpiece and emitting an energy beam toward the workpiece (directed energy deposition). Typical examples of the energy beam are laser beam and electron beam. In the present embodiment, a laser beam is used for additive manufacturing.

Additive manufacturing head 21 is mounted detachably on tool spindle 121. When additive manufacturing is to be performed, additive manufacturing head 21 is attached to tool spindle 121. As tool spindle 121 moves in the X-axis direction, the Y-axis direction, and the Z-axis direction, the position where additive manufacturing is performed by additive manufacturing head 21 is displaced three-dimensionally. Further, in the present embodiment, tool spindle 121 swivels about central axis 204 to change the direction of additive manufacturing (direction in which the laser beam is applied to a workpiece) performed by means of additive manufacturing head 21. When subtractive manufacturing is to be performed, additive manufacturing head 21 is detached from tool spindle 121.

A mechanism for moving additive manufacturing head 21 within machining area 200 may be provided separately from tool spindle 121.

Additive manufacturing head 21 includes a head body (main body) 22, a laser tool (energy beam emission part) 26, and a cable joint 23.

A laser beam and material powder are introduced into head body 22. Head body 22 of additive manufacturing head 21 is mounted detachably on tool spindle 121. Laser tool 26 is configured to emit a laser beam toward a workpiece and define a laser-beam-irradiated region on the workpiece.

While the present embodiment is described in connection with the case where means for defining a laser-beam-irradiated region on a workpiece is provided to laser tool 26, the embodiment is not limited to such a configuration and the whole or a part of the means for defining a laser-beam-irradiated region may be provided to head body 22 and/or cable joint 23.

Cable joint 23 is provided as a joint for connecting a cable 24 to head body 22. Cable 24 includes an optical fiber for directing a laser beam from a laser oscillator (not shown) disposed outside the machining area toward additive manufacturing head 21, a pipe for directing material powder from a material powder feeder (not shown) disposed outside the machining area toward additive manufacturing head 21, and a tube member that houses the optical fiber and the pipe.

The manufacturing machine including additive manufacturing head 21 is not limited to the aforementioned AM/SM hybrid manufacturing machine. For example, the manufacturing machine including additive manufacturing head 21 may be an AM/SM hybrid manufacturing machine configured based on a lathe, or an AM/SM hybrid manufacturing machine configured based on a machining center. When the AM/SM hybrid manufacturing is configured based on the machining center, a table is used as a workpiece holder for holding a workpiece. The manufacturing machine including additive manufacturing head 21 may be a manufacturing machine capable of additive manufacturing only.

Figure 2:
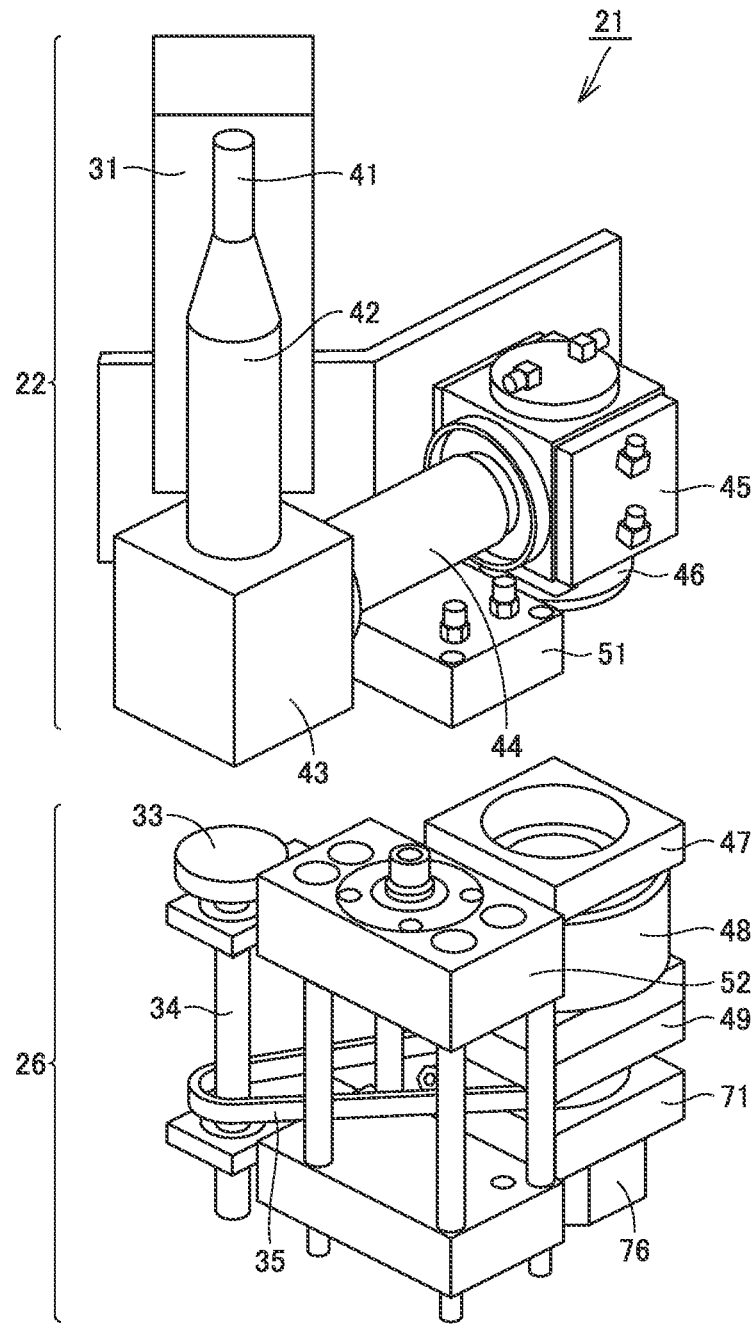
FIG. 2 is a perspective view showing an internal structure of the additive manufacturing head in FIG. 1.
Figure 3:
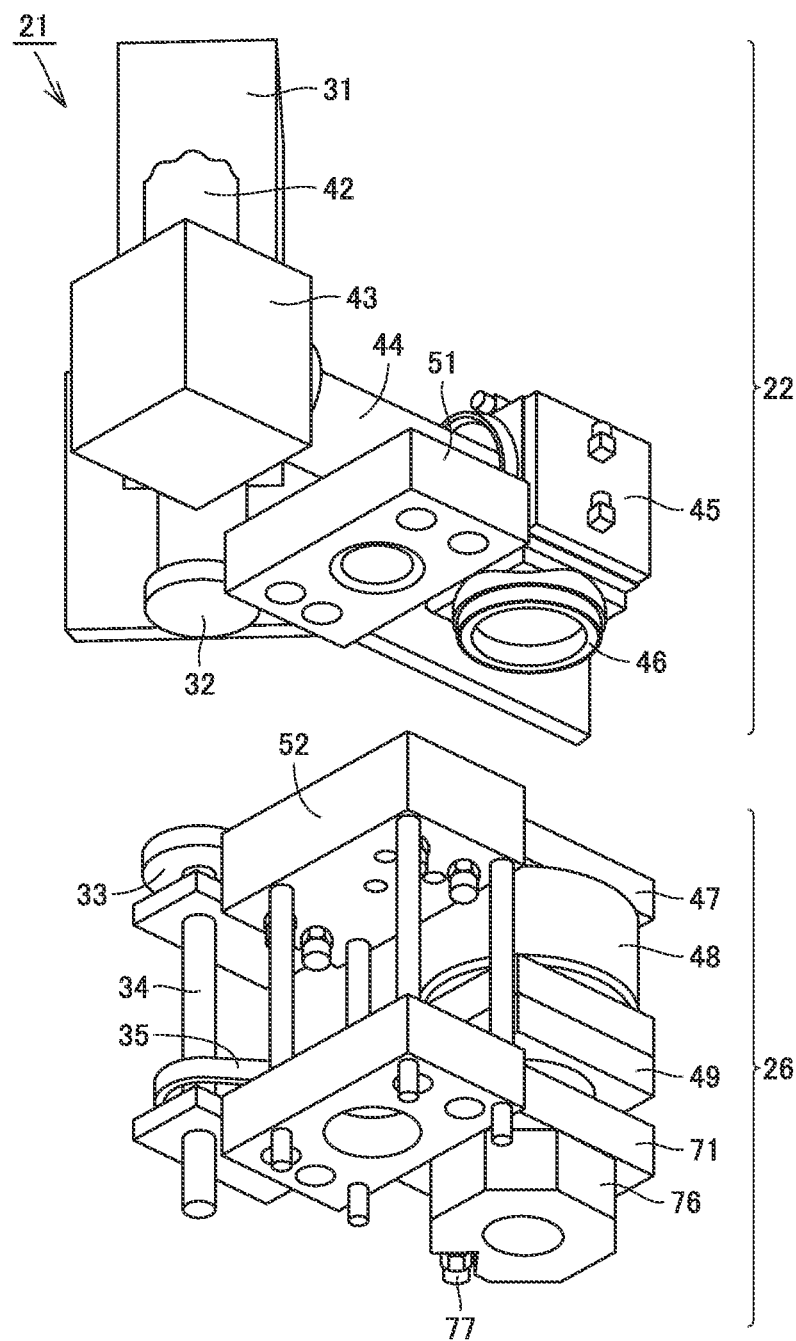
FIG. 3 is another perspective view showing the internal structure of the additive manufacturing head in FIG. 1.

Subsequently, the structure of the additive manufacturing head in FIG. 1 is described in more detail. FIG. 2 is a perspective view showing an internal structure of the additive manufacturing head in FIG. 1. FIG. 3 is another perspective view showing the internal structure of the additive manufacturing head in FIG. 1. In the drawings, the state where later tool 26 is separated from head body 22 is shown.

Referring to FIGS. 2 and 3, a coupling mechanism for head body 22 and laser tool 26 is described first. Head body 22 and laser tool 26 include a coupling part 51 and a coupling part 52, respectively. Coupling part 51 and coupling part 52 each contain a clamp mechanism. When laser tool 26 is to be attached to head body 22, the clamp mechanisms operate to connect coupling part 51 and coupling part 52 to each other. An example of the clamp mechanism may be a mechanism that uses a spring force to obtain a clamped state and uses a hydraulic pressure to obtain an unclamped state.

Next, a mechanism provided in additive manufacturing head 21 for applying a laser beam to a workpiece is described. Head body 22 includes an optical fiber 41, a laser beam inlet tube 42, a laser beam passage casing 43, a laser beam passage tube 44, and a laser beam passage casing 45.

A laser beam is directed from cable 24 in FIG. 1 to optical fiber 41. Optical fiber 41 is connected to laser beam inlet tube 42. Laser beam inlet tube 42, laser beam passage casing 43, laser beam passage tube 44, and laser beam passage casing 45 are consecutively arranged in this order. Laser beam inlet tube 42, laser beam passage casing 43, laser beam passage tube 44, and laser beam passage casing 45 form a passage for a laser beam in head body 22.

Laser tool 26 includes a laser beam passage casing 48 and a laser beam emission casing 49. Laser beam passage casing 48 and laser beam emission casing 49 are consecutively arranged. Laser beam passage casing 48 and laser beam emission casing 49 form a passage for a laser beam in laser tool 26.

Head body 22 and laser tool 26 include a connecting part 46 and a connecting part 47, respectively. When laser tool 26 is to be attached to head body 22, connecting part 47 is connected to connecting part 46 to thereby allow communication between head body 22 and laser tool 26 for passage of a laser beam.

Figure 4:
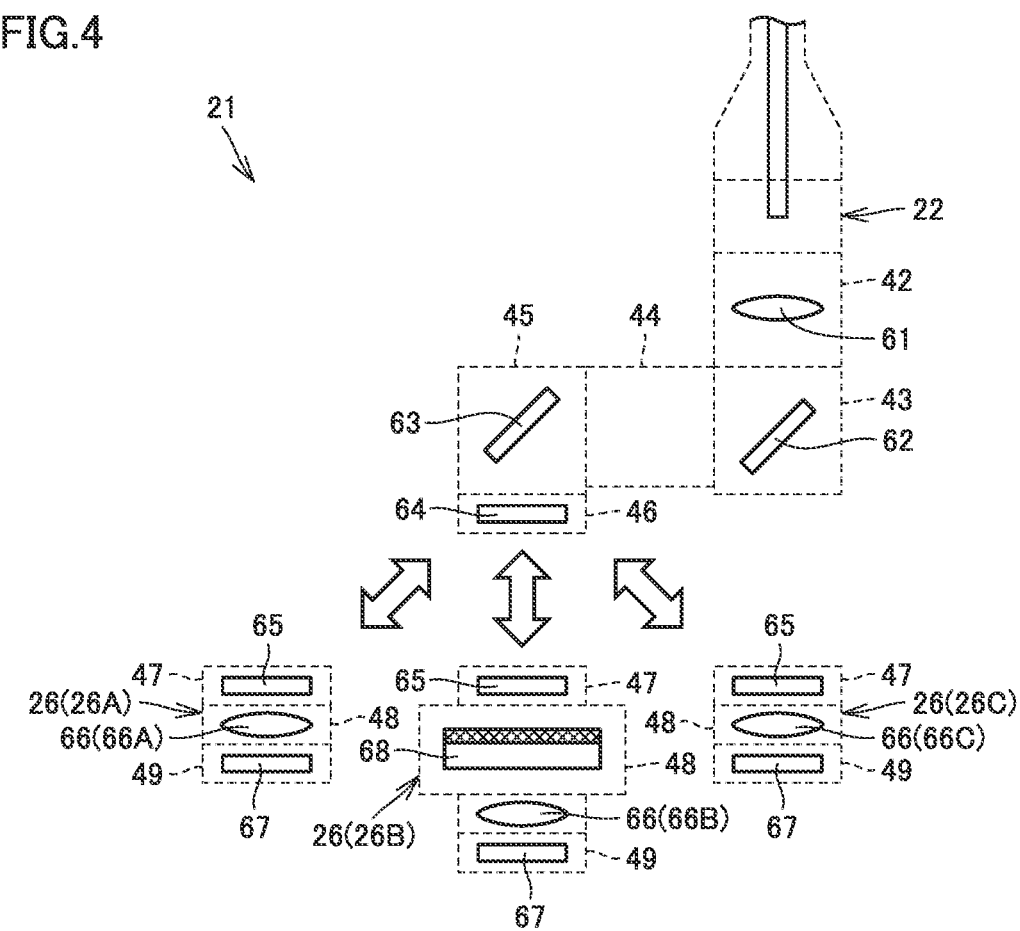
FIG. 4 is a diagram schematically showing an optical system for the additive manufacturing head in FIG. 1.

FIG. 4 is a diagram schematically showing an optical system for the additive manufacturing head in FIG. 1. Referring to FIGS. 2 to 4, head body 22 includes a collimation lens 61, a reflection mirror 62, a reflection mirror 63, and a protective glass 64.

Collimation lens 61 is housed in laser beam inlet tube 42. Collimation lens 61 collimates a laser beam entering from optical fiber 41 into parallel light and directs the light toward reflection mirror 62 and reflection mirror 63. Reflection mirror 62 and reflection mirror 63 are housed in laser beam passage casing 43 and laser beam passage casing 45, respectively. Reflection mirror 62 and reflection mirror 63 reflect the laser beam from collimation lens 61 to direct the laser beam toward laser tool 26.

Protective glass 64 is disposed in connecting part 46. Protective glass 64 is provided for protecting optical elements contained in head body 22 against the external ambient.

Laser tool 26 includes a protective glass 65, a condenser lens 66, and a protective glass 67. Condenser lens 66 is housed in laser beam passage casing 48. Condenser lens 66 is a lens for concentrating the laser beam onto a workpiece and provided as an optical element defining a laser-beam-irradiated region on the workpiece. The optical element defining a laser-beam-irradiated region on a workpiece is not limited to condenser lens 66, and may be a mirror, for example.

Protective glass 65 and protective glass 67 are disposed in connecting part 47 and laser beam emission casing 49, respectively. Protective glass 65 and protective glass 67 are disposed for protecting the optical elements contained in laser tool 26 against the external ambient.

To head body 22, a laser tool 26 that is any one of a plurality of laser tools 26 (laser tool 26A, laser tool 26B, and laser tool 26C in FIG. 4) is selectively attached, depending on conditions for additive manufacturing to be performed. The plurality of laser tools 26 differ from each other in terms of the shape and the size of the laser-beam-irradiated region defined on a workpiece.

With reference to the example shown in FIG. 4, laser tool 26A includes a condenser lens 66A and uses this condenser lens 66A to define a circular irradiated region with a diameter of 2 mm on a workpiece. Laser tool 26B includes a homogenizer 68 and a condenser lens 66B and uses homogenizer 68 and condenser lens 66B to define a rectangular irradiated region of 3 mm×8 mm on a workpiece. Laser tool 26C includes a condenser lens 66C and uses condenser lens 66C to define a circular irradiated region with a diameter of 4 mm on a workpiece.

Figure 5:
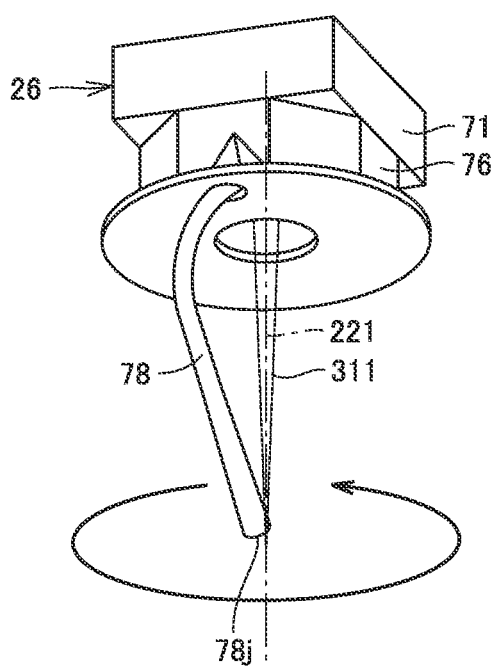
FIG. 5 is a perspective view showing a leading end of the additive manufacturing head in FIG. 1.

FIG. 5 is a perspective view showing a leading end of the additive manufacturing head in FIG. 1. Referring to FIGS. 2 to 5, a mechanism in additive manufacturing head 21 for discharging material powder toward a workpiece is described next. Laser tool 26 includes a stationary member 71, a rotary member 76, and a nozzle 78 (nozzle 78 is not shown in FIGS. 2 and 3).

Stationary member 71 is disposed to be adjacent to laser beam emission casing 49. Stationary member 71 is disposed opposite to laser beam passage casing 48 with respect to laser beam emission casing 49. Stationary member 71 is secured to other members that form laser tool 26.

Rotary member 76 is disposed to be rotatable about a central axis 221 (see FIG. 5). Central axis 221 extends in the direction along an optical axis of a laser beam 311 emitted from laser tool 26 toward a workpiece. In the present embodiment, central axis 221 coincides with the optical axis of laser beam 311. Rotary member 76 is disposed directly beside stationary member 71 in the axial direction of central axis 221. In other words, rotary member 76 and stationary member 71 are arranged side by side in the axial direction of central axis 221.

Nozzle 78 discharges material powder toward a workpiece. Nozzle 78 is connected to rotary member 76 through a pipe joint 77 (see FIG. 3). As detailed later herein, the material powder introduced from cable 24 in FIG. 1 into additive manufacturing head 21 is fed to nozzle 78 through stationary member 71 and rotary member 76.

Nozzle 78 extends from rotary member 76 in the direction in which laser beam 311 is emitted. Nozzle 78 is positioned radially away from central axis 221 (optical axis of laser beam 311). At the leading end of nozzle 78 extending from rotary member 76, nozzle 78 has a discharge outlet 78j from which material powder is discharged. Discharge outlet 78j has its opening positioned radially away from central axis 221 (optical axis of laser beam 311). The opening of discharge outlet 78j faces a region (spot) to be irradiated with laser beam 311 that is to be formed on a workpiece.

As rotary member 76 is rotated about central axis 221, nozzle 78 is moved in the circumferential direction about laser beam 311 emitted toward a workpiece. Particularly in the present embodiment, central axis 221 about which rotary member 76 rotates coincides with the optical axis of laser beam 311, and therefore, nozzle 78 revolves about the optical axis of laser beam 311.

Head body 22 includes a servo motor 31 serving as a rotary drive source, and a clutch plate 32. Laser tool 26 includes a clutch plate 33, a rotary shaft 34, and a pulley belt 35.

Clutch plate 32 is connected to an output shaft of servo motor 31. Rotary shaft 34 is connected to clutch plate 33. When laser tool 26 is attached to head body 22, frictional engagement between clutch plate 33 and clutch plate 32 causes rotation that is output from servo motor 31 to be transmitted to rotary shaft 34. Pulley belt 35 is wrapped around pulleys (not shown) disposed on rotary shaft 34 and rotary member 76. Rotation of rotary shaft 34 is transmitted through pulley belt 35 to rotary member 76 to cause rotary member 76 to rotate about central axis 221.

FIG. 6 is an enlarged cross-sectional view of a surface of a workpiece during additive manufacturing. Referring to FIG. 6, during additive manufacturing, tool spindle 121 to which additive manufacturing head 21 is attached is moved and/or spindle 112 of first headstock 111 holding a workpiece 400 is rotated (see FIG. 1) to cause additive manufacturing head 21 and workpiece 400 to move relative to each other while keeping laser tool 26 facing workpiece 400. At this time, laser beam 311, material powder 312, and shield-and-carrier gas 313 are discharged from additive manufacturing head 21 (laser tool 26) toward workpiece 400. Accordingly, a melt spot 314 is formed in the surface of workpiece 400 and consequently material powder 312 is melted and deposited.

Specifically, a cladding layer 316 is formed in the surface of workpiece 400. On cladding layer 316, a cladding material 315 is deposited. Cladding material 315 is cooled into a machinable layer formed on the surface of workpiece 400. As the material powder, metal powder of aluminum alloy, magnesium alloy, or the like, or ceramic powder may be used.

In additive manufacturing head 21 in the present embodiment, servo motor 31 is controlled to drive nozzle 78 for revolving nozzle 78 so that the direction in which material powder is discharged from nozzle 78 toward a workpiece is constant, relative to the direction in which additive manufacturing head 21 is moved relative to the workpiece. The reason why such control is performed is described in the following.

Figure 8:
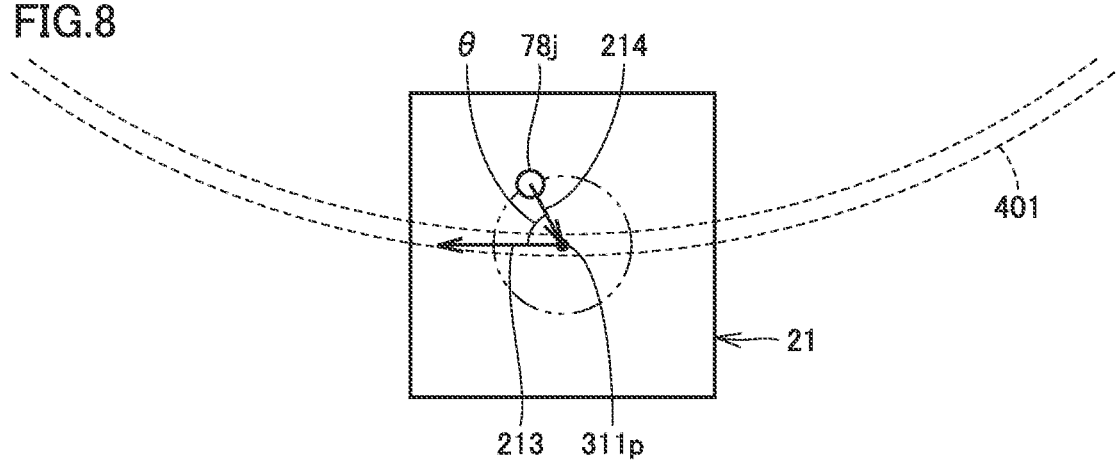
FIG. 8 is a diagram showing a relation between the direction in which a workpiece and an additive manufacturing head are moved relative to each other, and the direction in which material powder is discharged for additive manufacturing in FIG. 7.

FIG. 7 is a perspective view showing an example of additive manufacturing performed on a workpiece. FIG. 8 is a diagram showing a relation between the direction in which a workpiece and an additive manufacturing head are moved relative to each other, and the direction in which material powder is discharged for additive manufacturing in FIG. 7.

Referring to FIGS. 7 and 8, it is supposed here that additive manufacturing by means of additive manufacturing head 21 is performed to form a cladding layer 401 in a cylindrical shape on a surface of workpiece 400. In this case, workpiece 400 and additive manufacturing head 21 are moved relative to each other in the circumferential direction to deposit cladding layer 401. At this time, the direction in which workpiece 400 and additive manufacturing head 21 are moved relative to each other is the direction indicated by an arrow 213 in FIG. 8, and continuously changes as additive manufacturing proceeds.

Material powder is discharged from discharge outlet 78j of nozzle 78 toward a spot 311p of laser beam 311 on workpiece 400. As seen in the direction of the optical axis of laser beam 311, the direction in which the material powder is discharged toward workpiece 400 is the direction indicated by an arrow 214 in FIG. 8. At this time, the direction in which workpiece 400 and additive manufacturing head 21 are moved relative to each other and the direction in which material powder is discharged toward workpiece 400 have an optimum angular relation therebetween that provides a high deposition efficiency of the material powder on workpiece 400. Such an angular relation can be identified by examining how material powder is deposited on workpiece 400 while changing the angle formed between the direction in which workpiece 400 and additive manufacturing head 21 are moved relative to each other and the direction in which material powder is discharged toward workpiece 400. In the example of the additive manufacturing shown in the drawings, when the angle formed between the direction in which workpiece 400 and additive manufacturing head 21 are moved relative to each other and the direction in which material powder is discharged toward workpiece 400 is angle θ, a highest deposition efficiency of the material powder on workpiece 400 is achieved (for example, the material powder deposited on the workpiece is 70 to 90% relative to the amount of material powder discharged from nozzle 78).

Regarding additive manufacturing head 21 in the present embodiment, nozzle 78 is driven to revolve about laser beam 311 in such a manner that the angle formed between the direction in which workpiece 400 and additive manufacturing head 21 are moved relative to each other and the direction in which material powder is discharged toward workpiece 400 is kept at angle θ, regardless of the change of the direction in which workpiece 400 and additive manufacturing head 21 are moved relative to each other.

Accordingly, the deposition efficiency of material powder on workpiece 400 is improved through the entire additive manufacturing and the yield of the material powder can be improved. Moreover, the deposition efficiency of material powder on workpiece 400 does not vary, and therefore, cladding layer 401 having a thickness that is uniform in the circumferential direction can be formed.

Next, a mechanism for feeding material powder to nozzle 78 of additive manufacturing head 21 is described.

Figure 9:
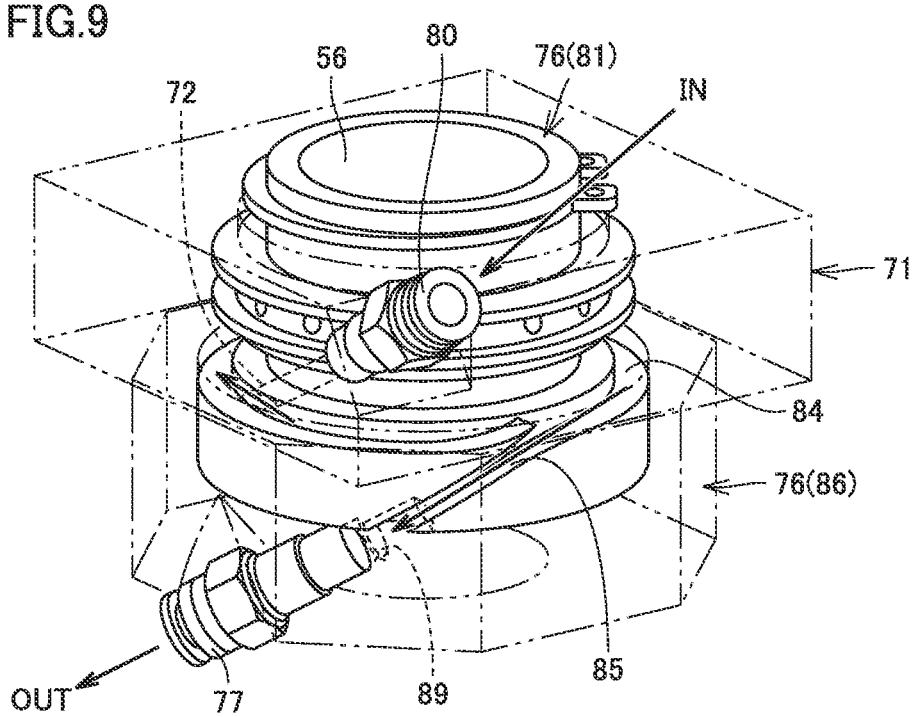
FIG. 9 is a perspective view showing a mechanism for feeding material powder to a nozzle of an additive manufacturing head.
Figure 10:
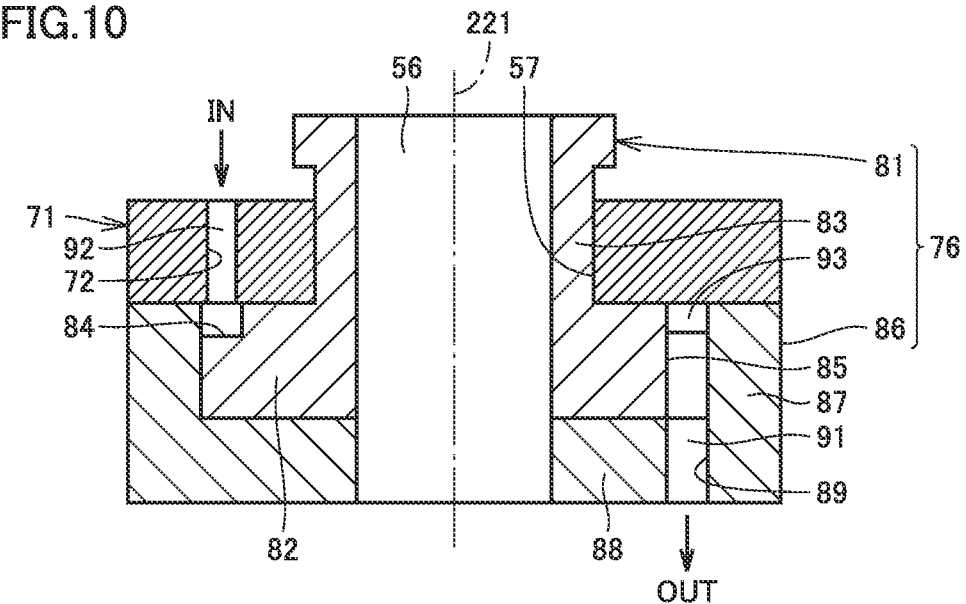
FIG. 10 is a cross-sectional view illustrating an internal structure of the mechanism for feeding material powder in FIG. 9.

FIG. 9 is a perspective view showing a mechanism for feeding material powder to a nozzle of an additive manufacturing head. In FIG. 9, stationary member 71 and rotary member 76 are drawn to be seen through partially. FIG. 10 is a cross-sectional view illustrating an internal structure of the mechanism for feeding material powder in FIG. 9.

Referring to FIGS. 9 and 10, rotary member 76 is made up of a combination of a flange (first member) 81 and a lid (second member) 86. Flange 81 and lid 86 are fastened to each other and rotate as a single unit about central axis 221.

Flange 81 includes, as its constituent parts, a cylindrical part 83 and a collar part 82. Cylindrical part 83 has a cylindrical shape centered at central axis 221. Collar part 82 is provided in the form of a collar extending from one end of cylindrical part 83. Cylindrical part 83 is inserted in a hollow part 57 of stationary member 71 described later herein, and collar part 82 abuts on stationary member 71 in the axial direction of central axis 221.

Lid 86 includes, as its constituent parts, a bottom plate 88 and a circumferential wall 87. Bottom plate 88 has a disk shape centered at central axis 221. Circumferential wall 87 is provided to erect from the periphery of bottom plate 88 in the axial direction of central axis 221. Bottom plate 88 abuts on a side of collar part 82 in the axial direction of central axis 221 that is opposite to the side of collar part 82 abutting on stationary member 71. Circumferential wall 87 is provided to cover the outer periphery of collar part 82.

In rotary member 76, a hollow part 56 is formed. Hollow part 56 extends through rotary member 76 in the axial direction of central axis 221. Hollow part 56 continuously extends through flange 81 and lid 86. A laser beam emitted from condenser lens 66 (see FIG. 4) as described above travels through hollow part 56 toward a workpiece.

Stationary member 71 is in the form of a block having its thickness in the axial direction of central axis 221. In stationary member 71, hollow part 57 is formed. Hollow part 57 has an opening having a circular cross section and extending through stationary member 71 in the axial direction of central axis 221. Rotary member 76 (cylindrical part 83 of flange 81) is inserted in hollow part 57. Rotary member 76 is supported rotatably about central axis 221 by stationary member 71.

As the mechanism for feeding material powder to nozzle 78, a material powder passage 91 is formed in rotary member 76, a material powder passage 92 is formed in stationary member 71, and a material powder passage 93 is formed between rotary member 76 and stationary member 71.

Material powder passage 93 communicates with material powder passage 91 and material powder passage 92. Material powder passage 92, material powder passage 93, and material powder passage 91 are arranged in this order from the upstream side to the downstream side in the direction of the flow of the material powder.

In FIG. 10, a cross section is shown of stationary member 71 and rotary member 76 in which material powder passage 92, material powder passage 93, and material powder passage 91 appear.

More specifically, a through hole 72 is formed in stationary member 71. Through hole 72 extends through stationary member 71 from the outer wall of stationary member 71 to the end face of stationary member 71 abutting on rotary member 76 (collar part 82 of flange 81). As seen from above the outer circumferential surface centered at central axis 221, through hole 72 extends obliquely to central axis 221.

To one opening end of through hole 72, a pipe joint 80 is connected. To through hole 72, a tube member extending from a tube for material powder in cable joint 23 in FIG. 1 is connected through pipe joint 80. The other opening end of through hole 72 opens in an annular groove 84 described later herein. Material powder passage 92 is formed by through hole 72.

In flange 81, annular groove 84 is formed. Annular groove 84 is formed in collar part 82. Annular groove 84 has a groove shape recessed from the corner formed by the end face of collar part 82 abutting on stationary member 71 and the outer circumferential surface of collar part 82 facing circumferential wall 87, and extends in the annular direction (360°) about central axis 221. Annular groove 84 defines a closed space together with stationary member 71 and circumferential wall 87 of lid 86. Material powder passage 93 is formed by annular groove 84.

In flange 81, an outer circumferential groove 85 is formed. Outer circumferential groove 85 is formed in collar part 82. Outer circumferential groove 85 has a groove shape recessed from the outer circumferential surface of collar part 82 facing circumferential wall 87. Outer circumferential groove 85 extends from one end face of collar part 82 that abuts on stationary member 71 to the other end face of collar part 82 that abuts on lid 86 (bottom plate 88). Outer circumferential groove 85 extends in the axial direction of central axis 221 while being displaced in the direction of the circumference about central axis 221. Outer circumferential groove 85 has one end connecting to annular groove 84 and the other end connecting to a through hole 89 described below.

In lid 86, through hole 89 is formed. Through hole 89 is formed in bottom plate 88. Through hole 89 extends through lid 86 from the end face of bottom plate 88 abutting on collar part 82 of flange 81 to the outer wall of lid 86. As lid 86 is seen from above the outer circumference centered at central axis 221, through hole 89 extends obliquely to central axis 221. Through hole 89 extends continuously from outer circumferential groove 85.

The other opening end of through hole 89 is connected to pipe joint 77. To through hole 89, nozzle 78 is connected through pipe joint 77. Material powder passage 91 is formed by outer circumferential groove 85 and through hole 89.

Figure 11:
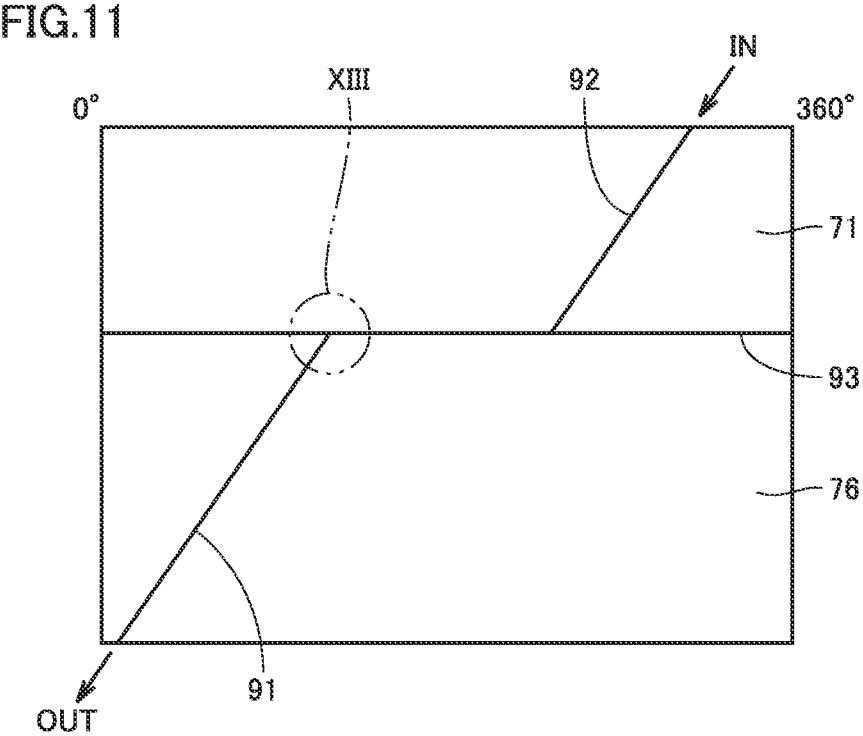
FIG. 11 is a schematic diagram two-dimensionally showing material powder passages in a stationary member and a rotary member in FIGS. 9 and 10.
Figure 12:
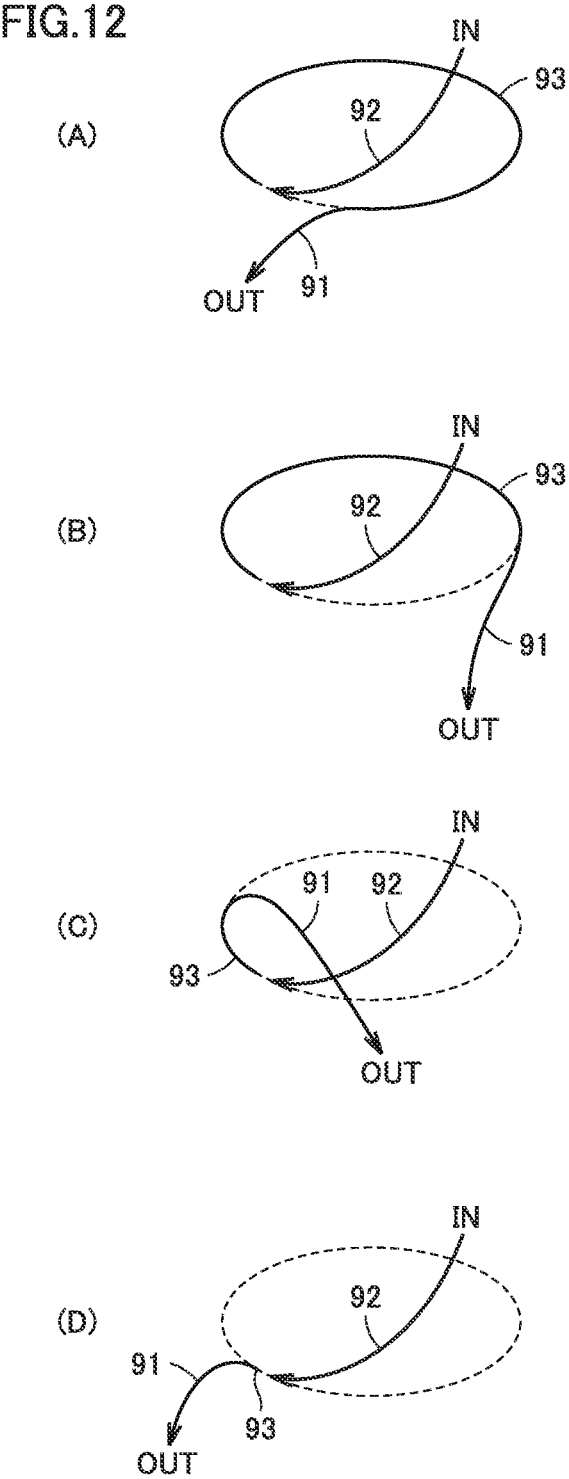
FIG. 12 shows variations of a material powder flow through material powder passages in FIG. 11.

FIG. 11 is a schematic diagram two-dimensionally showing material powder passages in the stationary member and the rotary member in FIGS. 9 and 10. FIG. 12 shows variations of a material powder flow through material powder passages in FIG. 11.

Referring to FIGS. 9 to 12, material powder is introduced into material powder passage 92. At this time, because material powder passage 92 is formed in stationary member 71, the pipe for the material powder is not twisted with respect to stationary member 71 even when rotary member 76 is rotated about central axis 221 to drive nozzle 78 to revolve.

The material powder introduced into material powder passage 92 flows into material powder passage 93. The material powder then flows in the circumferential direction in material powder passage 93 and enters material powder passage 91. At this time, the relative positional relation between the position at which material powder passage 92 communicates with material powder passage 93 and the position at which material powder passage 91 communicates with material powder passage 93 changes with rotation of rotary member 76 about central axis 221. The material powder flows in the circumferential direction in material powder passage 93, and therefore, regardless of such a change of the relative positional relation, the material powder can be guided from material powder passage 92 of stationary member 71 toward material powder passage 91 of rotary member 76.

The material powder entering material powder passage 91 is discharged toward a workpiece through nozzle 78.

In the present embodiment, material powder passage 92 extends in the axial direction of central axis 221 while being displaced in the circumferential direction in which material powder passage 93 extends. Material powder passage 91 extends in the axial direction of central axis 221 while being displaced in the circumferential direction in which material powder passage 93 extends.

Preferably, the displacement direction in which material powder passage 92 is displaced in the circumferential direction (displacement direction: the direction in which material powder passage 92 is inclined with respect to material powder passage 93 in FIG. 11) is the same as the displacement direction in which material powder passage 91 is displaced in the circumferential direction (displacement direction: the direction in which material powder passage 91 is inclined with respect to material powder passage 93).

The above-described configuration enables material powder to smoothly flow through material powder passage 92, material powder passage 93, and material powder passage 91 in this order.

Figure 13:
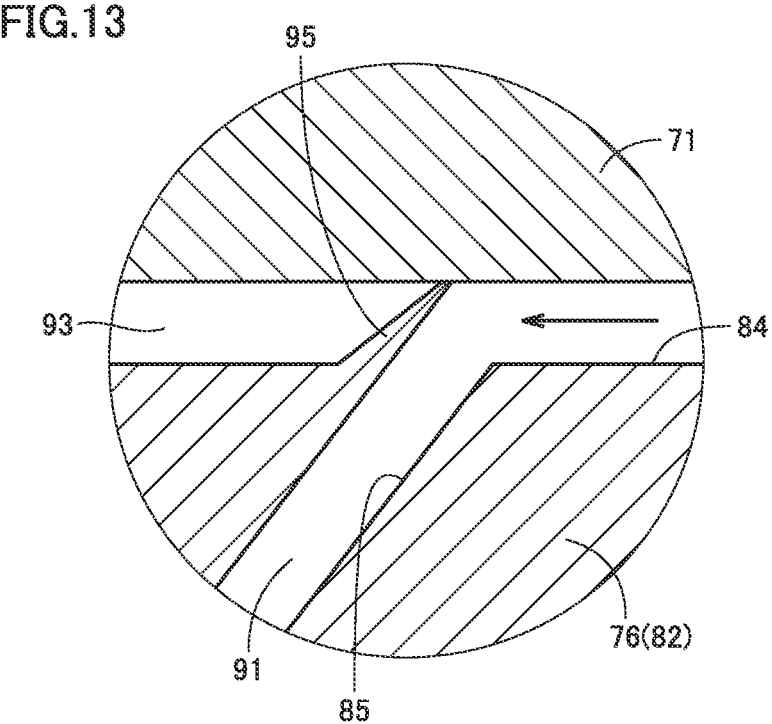
FIG. 13 is an enlarged cross-sectional view of an area enclosed by a two-dot chain line XIII in FIG. 11.

FIG. 13 is an enlarged cross-sectional view of an area enclosed by a two-dot chain line XIII in FIG. 11. Referring to FIG. 13, a protrusion (blocking member) 95 is provided between stationary member 71 and rotary member 76. Protrusion 95 is disposed to block, at a predetermined phase position, material powder passage 93 extending annularly about central axis 221.

Protrusion 95 forms a part of rotary member 76 (collar part 82 of flange 81). Protrusion 95 protrudes from the bottom wall of the annular groove and has its leading end abutting on stationary member 71. Protrusion 95 is disposed to be adjacent to the position where material powder passage 91 communicates with material powder passage 93 and located downstream of this position in the direction (the direction indicated by the arrow in FIG. 13) of the flow of the material powder in material powder passage 93.

The above-described configuration enables the material powder flowing in the circumferential direction in material powder passage 93 to more smoothly enter material powder passage 91.

The above-described structure of additive manufacturing head 21 in the first embodiment of the present invention is summarized. Additive manufacturing head 21 in the present embodiment is an additive manufacturing head configured to be movable relative to a workpiece while discharging material powder and emitting a laser beam as an energy beam toward the workpiece. Additive manufacturing head 21 includes: nozzle 78 configured to discharge the material powder; rotary member 76 connected with nozzle 78, including material powder passage 91 as a first material powder passage formed in rotary member 76 to direct the material powder to nozzle 78, and configured to rotate to cause nozzle 78 to move in the circumferential direction about the laser beam emitted toward the workpiece; and stationary member 71 including material powder passage 92 as a second material powder passage which is formed in stationary member 71 and into which the material powder is introduced, the stationary member being disposed directly beside rotary member 76 in the direction of the rotational axis of rotary member 76. Material powder passage 93 as a third material powder passage communicating with material powder passage 91 and material powder passage 92 and extending annularly about the rotational axis of rotary member 76 is formed between stationary member 71 and rotary member 76.

Manufacturing machine 100 in the present embodiment is a manufacturing machine capable of subtractive manufacturing and additive manufacturing for a workpiece. Manufacturing machine 100 includes additive manufacturing head 21, first headstock 111 and a second headstock (not shown) each provided as a workpiece holder configured to hold a workpiece; and tool spindle 121 and a lower tool rest (not shown) each provided as a tool holder configured to hold a tool to be used for subtractive manufacturing for a workpiece.

Additive manufacturing head 21 and manufacturing machine 100 configured as described above in the first embodiment of the present invention can implement a mechanism configured simply to feed material powder to nozzle 78 that is revolved infinitely.

Second Embodiment

In connection with the present embodiment, a description is given of various modifications of the mechanism for feeding material powder to the nozzle of additive manufacturing head 21 as described above in the first embodiment.

Figure 14:
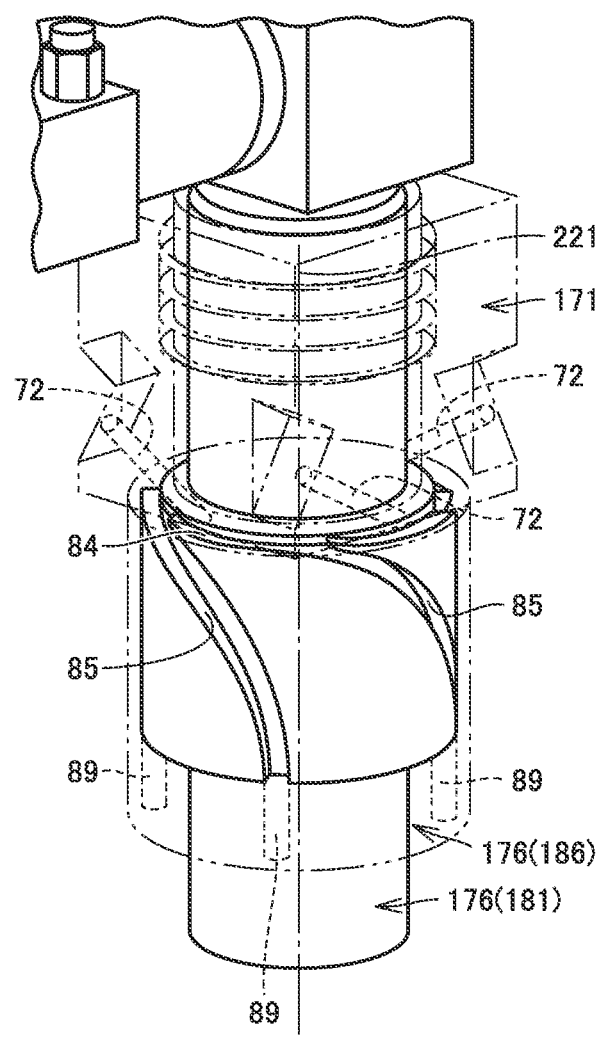
FIG. 14 is a perspective view showing a first modification of the mechanism for feeding material powder to the nozzle of the additive manufacturing head.
Figure 15:
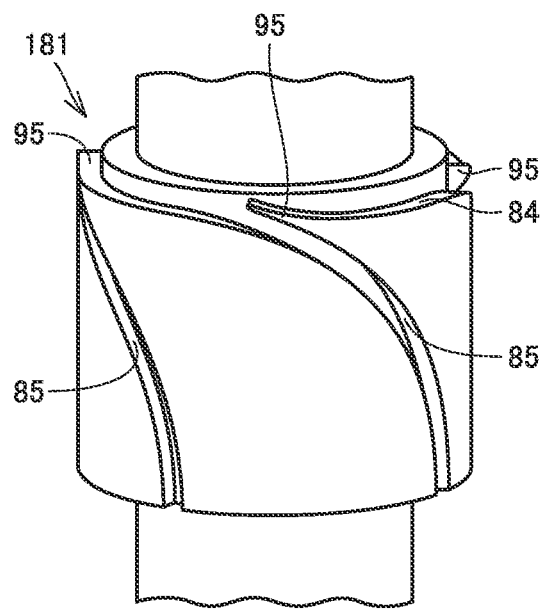
FIG. 15 is a perspective view showing a rotary member of the additive manufacturing head in FIG. 14.
Figure 16:
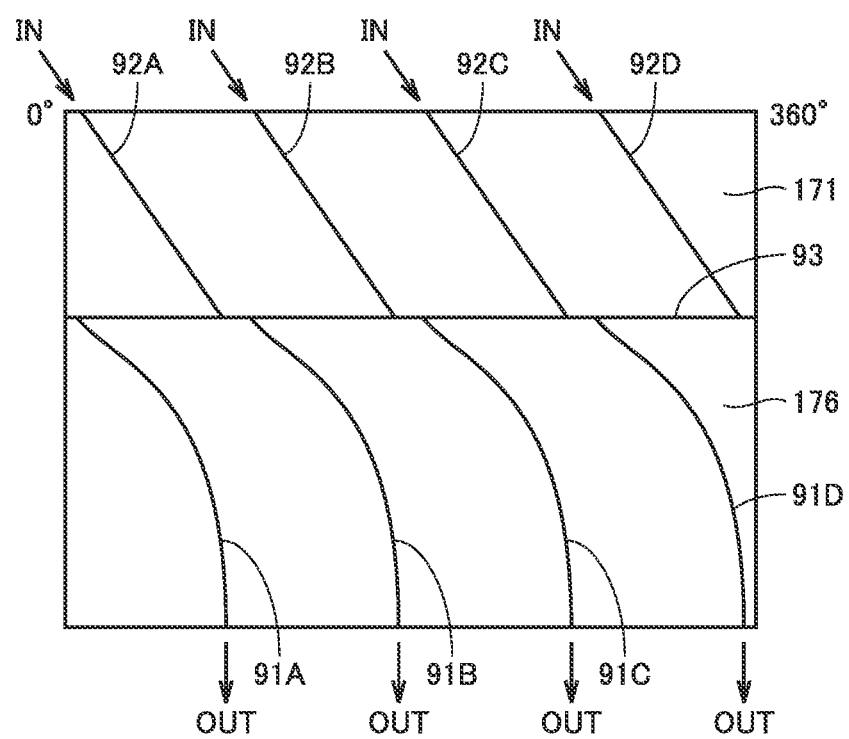
FIG. 16 is a schematic diagram two-dimensionally showing material powder passages in the stationary member and the rotary member in FIG. 14.

FIG. 14 is a perspective view showing a first modification of the mechanism for feeding material powder to the nozzle of the additive manufacturing head. FIG. 15 is a perspective view showing a rotary member of the additive manufacturing head in FIG. 14. FIG. 16 is a schematic diagram two-dimensionally showing material powder passages in the stationary member and the rotary member in FIG. 14.

Referring to FIGS. 14 to 16, the present embodiment includes a stationary member 171 and a rotary member 176 corresponding to stationary member 71 and rotary member 76 respectively in FIG. 9, and a cylinder 181 and a lid 186 corresponding to flange 81 and lid 86 respectively in FIG. 9. Cylinder 181 and lid 186 are fastened to each other and rotate as a single unit about central axis 221.

As the mechanism for feeding material powder to the nozzle, a plurality of material powder passages 91 (material powder passage 91A, material powder passage 91B, material powder passage 91C, and material powder passage 91D in the present embodiment) are formed in rotary member 176, a plurality of material powder passages 92 (material powder passage 92A, material powder passage 92B, material powder passage 92C, and material powder passage 92D in the present embodiment) are formed in stationary member 171, and a material powder passage 93 is formed between rotary member 176 and stationary member 171.

In stationary member 171, a plurality of through holes 72 are formed. The plurality of through holes 72 form a plurality of material powder passages 91. In cylinder 181, an annular groove 84 is formed. Annular groove 84 forms material powder passage 93. In cylinder 181 and lid 186, an outer circumferential groove 85 and a through hole 89 are formed, respectively. Outer circumferential groove 85 and through hole 89 form material powder passage 91.

A plurality of material powder passages 92 extend independently of each other. A plurality of material powder passages 92 communicate, at respective phase positions different from each other, with annularly extending material powder passage 93. A plurality of material powder passages 92 are located at regular intervals (regular phase intervals) with central axis 221 at the center. Material powder passage 92 extends in the axial direction of central axis 221 while being displaced in the direction of the circumference in which material powder passage 93 extends.

A plurality of material powder passages 91 extend independently of each other. A plurality of material powder passages 91 communicate, at respective phase positions different from each other, with annularly extending material powder passage 93. A plurality of material powder passages 91 are located at regular intervals (regular phase intervals) with central axis 221 at the center. Material powder passage 91 extends in the axial direction of central axis 221 while being displaced in the direction of the circumference in which material powder passage 93 extends. Material powder passage 91 extends in a curved shape from its one end communicating with material powder passage 93 to the other end connected to pipe joint 77 (see FIG. 9). In rotary member 176 (181) as seen from above the circumference centered at central axis 221, material powder passage 91 is curved with its inclination from central axis 221 decreasing in the direction from the one end toward the other end.

A plurality of material powder passages 91 are identical in number to a plurality of material powder passages 92. A plurality of material powder passages 91 may be larger or smaller in number than a plurality of material powder passages 92.

Respective flows of the material powder out of a plurality of material powder passages 91 are merged at the nozzle (not shown) and discharged toward a workpiece.

As seen from FIG. 12, depending on the relative positional relation between the position at which material powder passage 92 communicates with material powder passage 93 and the position at which material powder passage 91 communicates with material powder passage 93, the distance for which the material powder flows in the circumferential direction in material powder passage 93 varies. In this case, the distance for which the material powder is carried to be fed to the nozzle changes with time, and therefore, there is a possibility that pulsation of the material powder discharged toward the workpiece occurs.

In contrast, in this modification, a plurality of material powder passages 92 and a plurality of material powder passages 91 are provided to shorten the distance between the position at which material powder passage 92 communicates with material powder passage 93 and the position at which material powder passage 91 communicates with material powder passage 93, regardless of the phase position of rotary member 176 about the axial direction of central axis 221. Accordingly, variation of the distance for which the material powder flows in the circumferential direction in material powder passage 93 can be suppressed to prevent pulsation of the material powder.

Figure 17:
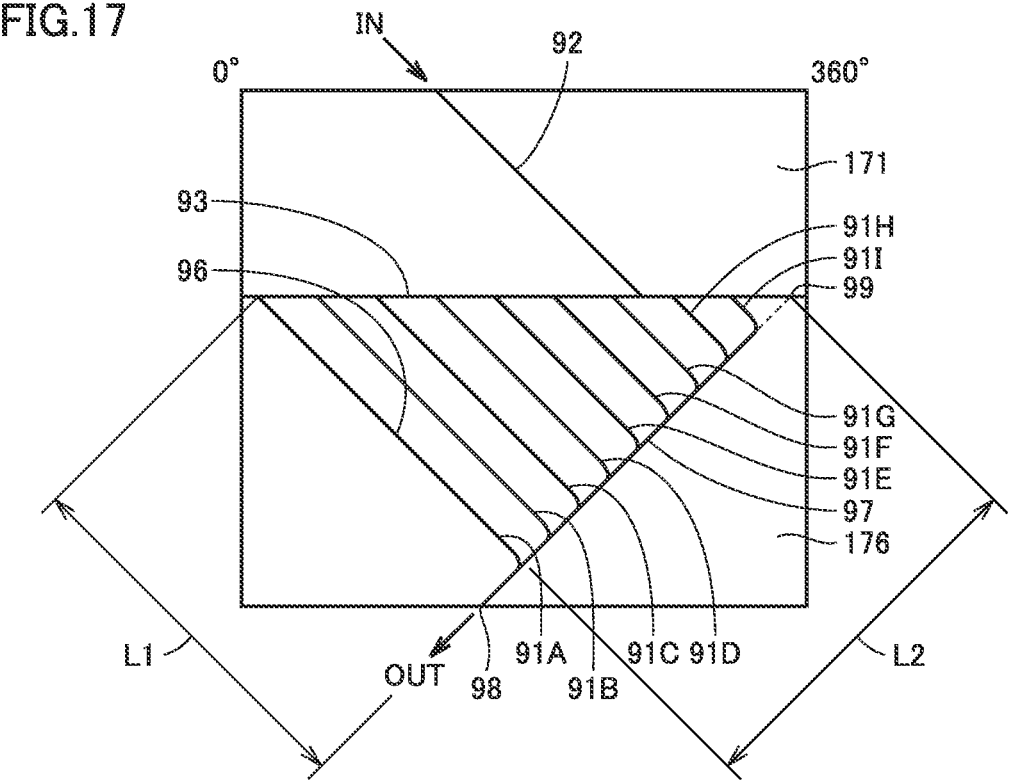
FIG. 17 is a schematic diagram showing a second modification of the mechanism for feeding material powder to the nozzle of the additive manufacturing head.

FIG. 17 is a schematic diagram showing a second modification of the mechanism for feeding material powder to the nozzle of the additive manufacturing head. FIG. 17 corresponds to FIG. 16 of the first modification.

Referring to FIG. 17, as the mechanism for feeding material powder to the nozzle in this modification, a plurality of material powder passages 91 (material powder passage 91A, material powder passage 91B, material powder passage 91C, material powder passage 91D, material powder passage 91E, material powder passage 91F, material powder passage 91G, material powder passage 91H, and material powder passage 91I in the present embodiment) are formed in rotary member 176, a material powder passage 92 is formed in stationary member 171, and a material powder passage 93 is formed between rotary member 176 and stationary member 171.

A plurality of material powder passages 91 communicate, at respective phase positions different from each other, with annularly extending material powder passage 93. A plurality of material powder passages 91 merge, at respective positions away from material powder passage 93, into a merging passage 97 and extend to a connecting position 98 at which they are connected to the nozzle (not shown).

A plurality of material powder passages 91 are provided to have the same passage length from where the material powder flows into material powder passage 91 from material powder passage 93 to where the material powder flows out of material powder passage 91 into the nozzle (not shown). More specifically, for each material powder passage 91 of material powder passages 91A to 91I, length L1 of material powder passage 91 is equal to length L2 from where material powder passage 91 merges into merging passage 97 to a position 99 defined at an intersection of material powder passage 93 and an extension of merging passage 97.

In this modification as well, a plurality of material powder passages 91 are provided to shorten the distance between the position where material powder passage 92 communicates with material powder passage 93 to the position where material powder passage 91 communicates with material powder passage 93, regardless of the phase position of rotary member 176 centered at central axis 221. In this way, pulsation of the material powder can be prevented. In particular, a plurality of material powder passages 91 are identical to each other in terms of the length of the passage extending from where the material powder flows into passage 91 from material powder passage 93 to where the material powder flows out of passage 91 into the nozzle (not shown). Thus, pulsation of the material powder can more effectively be prevented.

Figure 18:
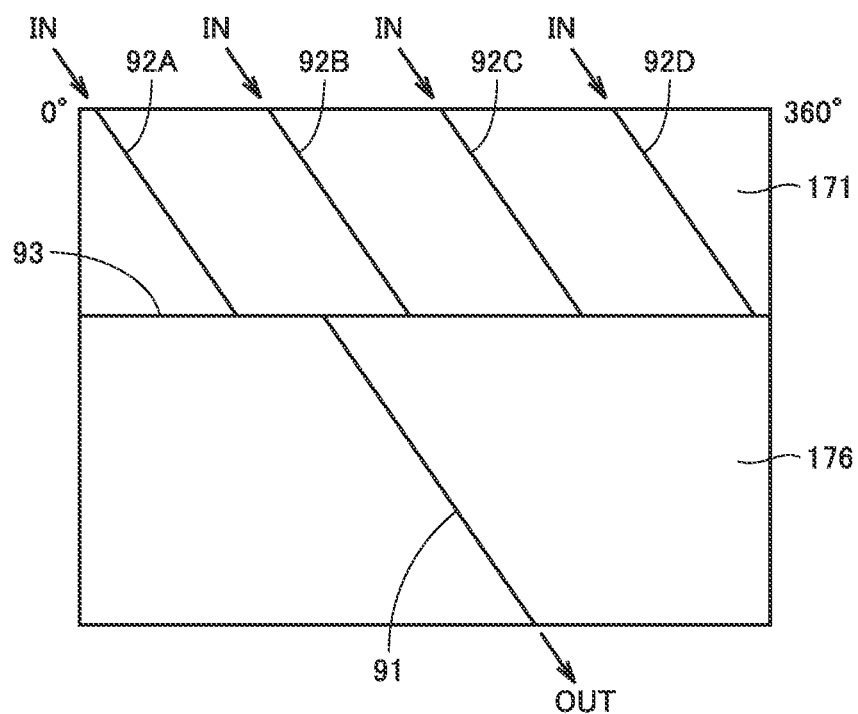
FIG. 18 is a schematic diagram showing a third modification of the mechanism for feeding material powder to the nozzle of the additive manufacturing head.

FIG. 18 is a schematic diagram showing a third modification of the mechanism for feeding material powder to the nozzle of the additive manufacturing head. FIG. 18 corresponds to FIG. 16 of the first modification.

Referring to FIG. 18, as the mechanism for feeding material powder to the nozzle in this modification, a material powder passage 91 is formed in rotary member 176, a plurality of material powder passages 92 (material powder passage 92A, material powder passage 92B, material powder passage 92C, and material powder passage 92D in the present embodiment) are formed in stationary member 171, and a material powder passage 93 is formed between rotary member 176 and stationary member 171.

A plurality of material powder passages 92 extend independently of each other. A plurality of material powder passages 92 communicate, at respective phase positions different from each other, with annularly extending material powder passage 93. A plurality of material powder passages 92 are located at regular intervals (regular phase intervals) with central axis 221 at the center. Material powder passage 92 extends in the axial direction of central axis 221 while being displaced in the circumferential direction in which material powder passage 93 extends.

In this modification as well, a plurality of material powder passages 92 are provided to shorten the distance between the position at which material powder passage 92 communicates with material powder passage 93 and the position at which material powder passage 91 communicates with material powder passage 93, regardless of the phase position of rotary member 176 about the axial direction of central axis 221. Accordingly, pulsation of the material powder can be prevented.

In this modification, a plurality of material powder passages 92 may be different from each other in terms of the type of material powder introduced into material powder passage 92. For example, for material powder that is a powder mixture of Material A and Material B, a plurality of material powder passages 92 may be different from each other in terms of the powder ratio between Material A and Material B. The material powder can be introduced into material powder passages 92 selected from a plurality of material powder passages 92 as appropriate for additive manufacturing to be performed to discharge the material powder having an appropriate powder ratio toward a workpiece.

The additive manufacturing head in the second embodiment of the present invention configured in this way can produce similar effects to those of the first embodiment.

An additive manufacturing head according to the present invention is an additive manufacturing head configured to be movable relative to a workpiece while discharging material powder and emitting an energy beam toward the workpiece.

The additive manufacturing head includes: a nozzle configured to discharge the material powder; a rotary member connected with the nozzle, including a first material powder passage formed in the rotary member to direct the material powder to the nozzle, and configured to rotate to cause the nozzle to move in a circumferential direction about the energy beam emitted toward the workpiece; and a stationary member including a second material powder passage which is formed in the stationary member and into which the material powder is introduced, the stationary member being disposed directly beside the rotary member in the direction of the rotational axis of the rotary member. A third material powder passage communicating with the first material powder passage and the second material powder passage and extending annularly about the rotational axis of the rotary member is formed between the stationary member and the rotary member.

Regarding the additive manufacturing head configured in this way, the material powder flows in the second material powder passage which is formed in the stationary member and receives the material powder introduced into the second material powder passage, then flows in the third material powder passage which is formed between the stationary member and the rotary member and extends annularly about the rotational axis of the rotary member, and then flows in the first material powder passage which is formed in the rotary member to direct the material powder to the nozzle, to be fed to the nozzle. The mechanism for feeding the material powder to the nozzle that is revolved infinitely can thus be configured simply.

Preferably, the additive manufacturing head further includes a drive unit configured to drive the nozzle for revolving the nozzle so that a direction in which the material powder is discharged from the nozzle toward the workpiece is constant with respect to a direction in which the additive manufacturing head moves relative to the workpiece.

The additive manufacturing head configured in this way can improve the deposition efficiency of the material powder on a workpiece.

Preferably, the first material powder passage and the second material powder passage extend in the direction of the rotational axis of the rotary member while being displaced in a circumferential direction in which the third material powder passage extends.

The additive manufacturing head configured in this way allows the material powder to smoothly flow successively in the second material powder passage, the third material powder passage, and the first material powder passage.

Preferably, the additive manufacturing head further includes a blocking member disposed between the stationary member and the rotary member for blocking, at a predetermined phase position, the annularly extending third material powder passage.

In the additive manufacturing head configured in this way, the flow of the material powder can be blocked at a predetermined phase position in the third material powder passage to thereby allow the material powder to flow from the third material powder passage into the first material powder passage smoothly.

Preferably, the blocking member forms a part of the rotary member and is disposed to be adjacent to a position where the first material powder passage communicates with the third material powder passage, the blocking member being located downstream of the position in a direction of flow of the material powder in the third material powder passage.

In the additive manufacturing head configured in this way, the material powder from the third material powder passage is allowed to flow more smoothly into the first material powder passage.

Preferably, a plurality of the first material powder passages communicating, at respective phase positions different from each other, with the annularly extending third material powder passage are formed in the rotary member.

In the additive manufacturing head configured in this way, the difference in the distance for which the material powder is carried in the third material powder passage can be reduced to suppress pulsation of the material powder discharged toward a workpiece.

Preferably, the plurality of the first material powder passages are disposed to have the same passage length from where the material powder flows into the first material powder passage from the third material powder passage to where the material powder flows out of the first material powder passage into the nozzle.

In the additive manufacturing head configured in this way, the difference in material powder passage length between the plurality of first material powder passages can be eliminated to suppress pulsation of the material powder discharged toward a workpiece more effectively.

Preferably, a plurality of the second material powder passages communicating, at respective phase positions different from each other, with the annularly extending third material powder passage are formed in the stationary member In the additive manufacturing head configured in this way, the difference in the distance for which the material powder is carried in the third material powder passage can be reduced to suppress pulsation of the material powder discharged toward a workpiece.

A manufacturing machine according to the present invention is a manufacturing machine capable of subtractive manufacturing and additive manufacturing for a workpiece. The manufacturing machine includes: any of the above-described additive manufacturing heads; a workpiece holder configured to hold a workpiece; and a tool holder configured to hold a tool to be used for subtractive manufacturing for a workpiece.

In the manufacturing machine configured in this way, the additive manufacturing head of the manufacturing machine capable of subtracting manufacturing and additive manufacturing for a workpiece can implement a mechanism configured simply to feed material powder to a nozzle that is revolved infinitely.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is chiefly applied to additive manufacturing heads for performing additive manufacturing based on the directed energy deposition.

REFERENCE SIGNS LIST

21 additive manufacturing head; 22 head body; 23 cable joint; 24 cable; 26, 26A, 26B, 26C laser tool; 31 servo motor; 32, 33 clutch plate; 34 rotary shaft; 35 pulley belt; 41 optical fiber; 42 laser beam inlet tube; 43, 45, 48 laser beam passage casing; 44 laser beam passage tube; 46, 47 connecting part; 49 laser beam emission casing; 51, 52 coupling part; 56, 57 hollow part; 61 collimation lens; 62, 63 reflection mirror; 64, 65, 67 protective glass; 66, 66A, 66B, 66C condenser lens; 68 homogenizer; 71, 171 stationary member; 72, 89 through hole; 76, 176 rotary member; 77, 80 pipe joint; 78 nozzle; 78*j* discharge outlet; 81 flange; 82 collar part; 83 cylindrical part; 84 annular groove; 85 outer circumferential groove; 86, 186 lid; 87 circumferential wall; 88 bottom plate; 91, 91A-91I, 92, 92A-92D, 93 material powder passage; 95 protrusion; 97 merging passage; 98 connecting position; 99 position; 100 manufacturing machine; 111 first headstock; 112 spindle; 121 tool spindle; 181 cylinder; 201, 203, 204, 221 central axis; 206 splashguard; 311 laser beam; 311*p* spot; 312 material powder; 313 gas; 314 melt spot; 315 cladding material; 316, 401 cladding layer; 400 workpiece

The invention claimed is:

1. An additive manufacturing head configured to be movable relative to a workpiece while discharging material powder and emitting an energy beam toward the workpiece, the additive manufacturing head comprising:
    a nozzle configured to discharge the material powder;
    a rotary member connected with the nozzle, including a first material powder passage formed in the rotary member to direct the material powder to the nozzle, and configured to rotate to cause the nozzle to move in a circumferential direction about the energy beam emitted toward the workpiece; and
    a stationary member including a second material powder passage which is formed in the stationary member and into which the material powder is introduced, the stationary member being disposed directly beside the rotary member in a direction of a rotational axis of the rotary member,
    wherein a third material powder passage is formed between the stationary member and the rotary member, the third material passage communicating with the first material powder passage and the second material powder passage and extending annularly about the rotational axis of the rotary member.

2. The additive manufacturing head according to claim 1, further comprising a drive unit configured to drive the nozzle for revolving the nozzle so that a direction in which the material powder is discharged from the nozzle toward the workpiece is constant with respect to a direction in which the additive manufacturing head moves relative to the workpiece.

3. The additive manufacturing head according to claim 1, wherein
    the first material powder passage and the second material powder passage extend in the direction of the rotational axis of the rotary member while being displaced in a circumferential direction in which the third material powder passage extends.

4. The additive manufacturing head according to claim 1, further comprising a blocking member disposed between the stationary member and the rotary member for blocking, at a predetermined phase position, the annularly extending third material powder passage.

5. The additive manufacturing head according to claim 4, wherein
    the blocking member is a part of the rotary member and is disposed to be adjacent to a position where the first material powder passage communicates with the third material powder passage, the blocking member being located downstream of the position in a direction of flow of the material powder in the third material powder passage.

6. The additive manufacturing head according to claim 1, wherein
    a plurality of the first material powder passages communicating, at respective phase positions different from each other, with the annularly extending third material powder passage are formed in the rotary member.

7. The additive manufacturing head according to claim 6, wherein
    the plurality of the first material powder passages are disposed to have the same passage length from where the material powder flows into the first material powder passage from the third material powder passage to where the material powder flows out of the first material powder passage into the nozzle.

8. The additive manufacturing head according to claim 1, wherein
    a plurality of the second material powder passages communicating, at respective phase positions different from each other, with the annularly extending third material powder passage are formed in the stationary member.

9. A manufacturing machine capable of subtractive manufacturing and additive manufacturing for a workpiece, the manufacturing machine comprising:
    the additive manufacturing head as recited in claim 1;
    a holder configured to hold the workpiece; and
    a tool holder configured to hold a tool to be used for subtractive manufacturing for the workpiece.

* * * * *